Nov. 15, 1932.                J. H. SHERTS                1,887,564
                    PROCESS FOR SEVERING COMPOSITE GLASS
                            Filed March 7, 1930
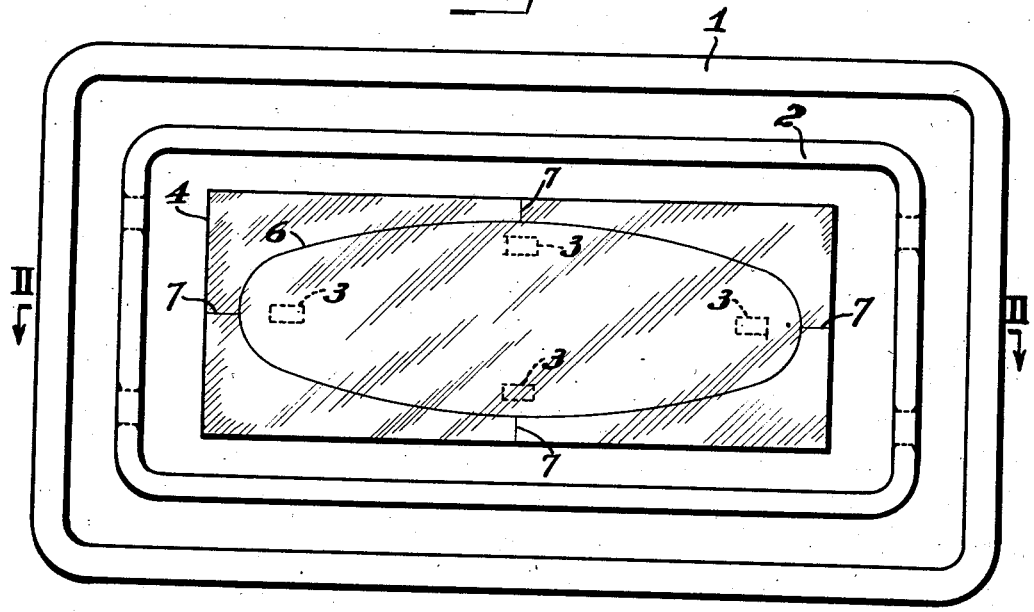
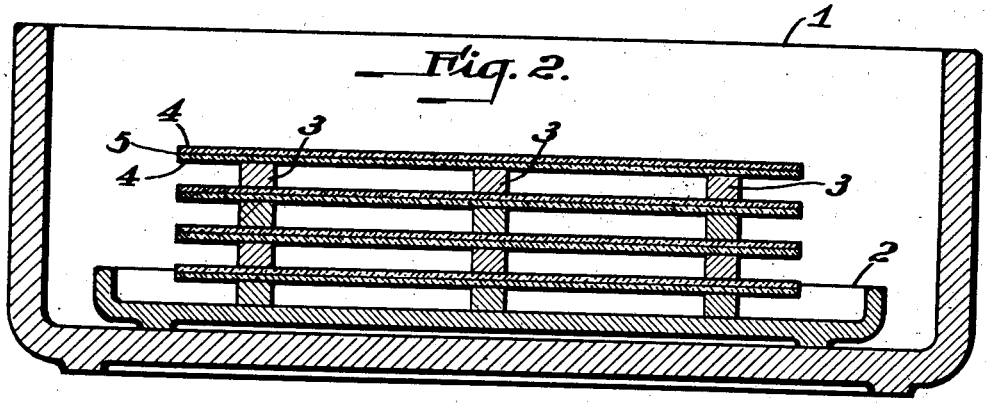
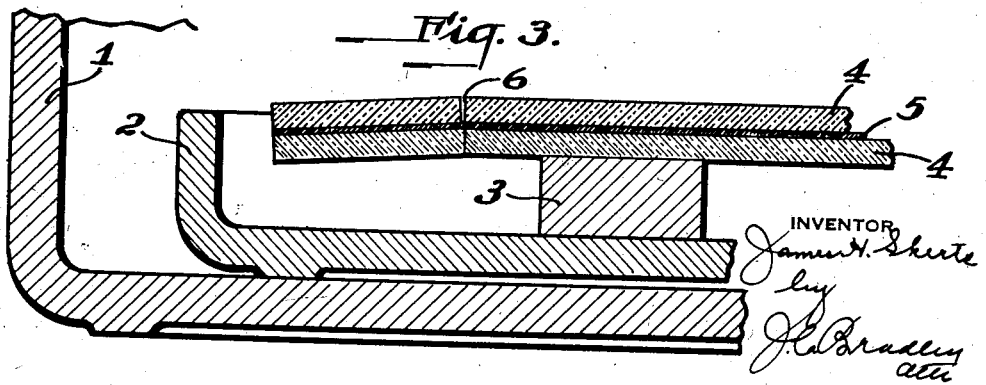

Patented Nov. 15, 1932

1,887,564

UNITED STATES PATENT OFFICE

JAMES H. SHERTS, OF BRACKENRIDGE, PENNSYLVANIA, ASSIGNOR TO DUPLATE CORPORATION, A CORPORATION OF DELAWARE

PROCESS FOR SEVERING COMPOSITE GLASS

Application filed March 7, 1930. Serial No. 433,943.

The invention relates to a process for severing composite glass, such glass being ordinarily made of two sheets of glass cemented to the opposite faces of a sheet of pyroxylin plastic; such as celluloid. This composite glass is difficult to cut to shape, and it has been proposed heretofore to score and crack both glass sheets with a diamond or wheel and then place the glass in a bath of a solvent or acid, so that the liquid of the bath will penetrate the cracks in the glass and dissolve the plastic and thus cause a separation of the composite plate along the desired line. To promote the dissolving action heat is sometimes applied. The objection to this process is its slowness, several hours being ordinarily required to cause the necessary separation, and it is the object of the present invention to speed up the dissolving action of the solvent so that the composite plate may be separated in a few minutes. Briefly stated, this result is accomplished by supporting the cracked sheets in the bath of solvent in such way that the force of gravity tends to open or widen the cracks in one of the glass plates thus permitting the solvent to work more and more rapidly as the cracks open. The method of procedure will be understood by reference to the accompanying drawing, wherein:

Figure 1 is a plan view showing a set of plates supported in accordance with the invention in a bath of solvent. Fig. 2 is a section on the line II—II of Fig. 1. And Fig. 3 is an enlarged detail section showing the effect of the arrangement in promoting the action of the solvent.

Referring to the drawing, 1 is a tank carrying the solvent which is to be employed; 2 is a tray which forms a convenient means for supporting a set of plates in carrying them to and from the tank and for catching the pieces of material which are separated from the plates; and 3, 3, 3. 3 are sets of blocks for supporting the plates in accordance with the invention. Each of the plates comprises a pair of glass sheets 4, 4 cemented to the faces of the pyroxylin sheet 5.

If ovals are to be cut from the rectangular glass plates, the glass sheets 4 are scored, as indicated at 6, and cracked along the lines of scoring preliminary to putting the plates in the tray. They are then placed in the tray with the blocks 3, 3, 3, arranged just inside the lines of cracking 6 as indicated in Fig. 1. This leaves the edges of the plates lying on the outside of such lines of cracking unsupported. The tray is then submerged in the solvent (not shown) which has a temperature in the neighborhood of 240 degrees F. As soon as the plastic 5 is slightly softened by the action of the heat, the unsupported edges of the plates begin to sag, as indicated in Fig. 3, thus opening the crack 6 in the upper glass sheet of each plate and permitting the solvent to have free access to the plastic sheet 5 along the line of the crack. The solvent quickly dissolves the plastic so that the edges of the plates drop off and sink to the bottom of the tray.

It is possible to use a large number of different solvents, but one preferably employed is diethyl glycol, such solvent having a high boiling point and rapid solvent action. The solvents may be applied either with or without the application of pressure, the separating action of the solvent being somewhat more rapid when pressure is applied to the liquid than when it is not applied. The method of arranging the supporting blocks will vary with the character of the cut, the blocks being arranged in each case so as to cause the cracks in one of the glass sheets in the plate to open up under the action of gravity when the plastic is softened by the action of the heated liquid. To facilitate the sagging of the edges of the plate in the cutting of a shape, such as an oval or circle, the edge portions of the glass sheets are scored and cracked along the lines 7, 7 in addition to the scoring and cracking along the line 6.

What I claim is:

1. A process of severing a composite sheet comprising sheets of glass secured to the opposite faces of a sheet of pyroxylin plastic, which consists in cracking the glass sheets along the desired line of severance, supporting the plate so that the action of gravity upon the plate tends to spread the crack in one of said glass sheets, and exposing the plate so supported to the action of a solvent for the plastic heated to a point where it softens the plastic.

2. A process of severing a composite sheet comprising sheets of glass secured to the opposite faces of a sheet of pyroxylin plastic, which consists in cracking the glass sheets along the desired line of severance, supporting the plate so that the action of gravity upon the plate tends to spread the crack in one of said glass sheets, and submerging the sheet so supported in a bath of pyroxylin plastic solvent heated to a point where it softens the plastic causing the sheet to sag where cracked and giving access to the plastic along the line of cracking.

In testimony whereof, I have hereunto subscribed my name this third day of March, 1930.

JAMES H. SHERTS.